United States Patent [19]
Hehl

[11] 3,936,262
[45] Feb. 3, 1976

[54] MULTI-ORIFICE INJECTOR NOZZLE FOR INJECTION MOLDING MACHINE

[76] Inventor: Karl Hehl, Arthur-Hehl Strasse 32, 7291 Lossburg, Germany

[22] Filed: May 15, 1974

[21] Appl. No.: 470,283

[30] Foreign Application Priority Data
July 28, 1973 Germany............................ 2338458

[52] U.S. Cl................. 425/248; 222/478; 137/599; 137/561 A
[51] Int. Cl.² .............................................. B29F 1/03
[58] Field of Search.................... 425/192, 247, 248; 222/478; 137/599, 561 A; 285/386, 387; 403/342

[56] References Cited
UNITED STATES PATENTS

| | | | |
|---|---|---|---|
| 2,578,492 | 12/1951 | Simpkins et al. ...................... | 249/96 |
| 2,590,947 | 4/1952 | Denis .............................. | 285/386 X |
| 2,672,653 | 3/1954 | Simpkins......................... | 425/250 X |
| 3,561,053 | 2/1971 | Pearson ........................... | 425/192 |
| 3,758,252 | 9/1973 | Kohler............................ | 425/247 X |

Primary Examiner—Francis S. Husar
Assistant Examiner—David S. Safran
Attorney, Agent, or Firm—Joseph A. Geiger

[57] ABSTRACT

A multi-orifice injector nozzle in which a main channel is bifurcated into two slanting intermediate channels which are again bifurcated, the resulting outer branches leading to outer nozzle inserts, while the inner branches are joined above a central nozzle insert. All channels are obtained as smoothly curved congruent grooves milled into the clamping faces of a split injector head.

11 Claims, 3 Drawing Figures

MULTI-ORIFICE INJECTOR NOZZLE FOR INJECTION MOLDING MACHINE

BACKGROUND OF THE INVENTION

1. Field of the Invention

The present invention relates to injector nozzles for injection molding machines, and in particular to multi-orifice injector nozzles for the simultaneous injection of material through a plurality of injection channels into an injection mold.

2. Description of the Prior Art

Multi-orifice injector nozzles have been known for some time in conjunction with injection molding machines. One such device is disclosed in my copending prior application Ser. No. 259,279, now U.S. Pat. No. 3,820,930. There, I have disclosed a three-orifice injector nozzle in which the orifices are interconnected within the body of the injector head by branch channels which start from the main channel at right angles, and lead into three parallel nozzle inserts via right-angle junctions.

A peculiar problem was encountered with this type of multi-orifice injector nozzle in connection with thermoplastic materials which are very sensitive to changes in temperature. This is the case, for example, with the polymerization products of vinyl chloride which are moldable successfully only within a rather narrow temperature range. Thus, it was found that, when clear plastic material such as hard polyvinyl chloride is molded, visible impurities becomes embedded in the finished molded part. These impurities have been found to be thermally decomposed plastic particles.

SUMMARY OF THE INVENTION

It is a primary objective of the present invention to suggest an improved multi-orifice injector nozzle for injection molding machines which is better suited for the injection of thermally highly sensitive plastic materials, by minimizing the risk of structural damage to the processed material from thermal overloading.

In order to attain the above objective, the present invention proposes a multi-orifice injector nozzle in which the main channel and the branch channels are constituted by congruent grooves defined by the two separable halves of an injector head, which halves are clamped together at the separation plane which coincides with the center plane of the multi-orifice nozzle, the main channel being bifurcated into two intermediate branch lines of halved cross section, via curved channel entry portions, the slanting intermediate branch channels leading to a reversely curved channel portion and hence to the parallel injection channels.

In the case of a three-orifice injector head, the two intermediate branch lines of halved cross section are preferably again bifurcated, each branch line being split into an outside line leading to an outer injection channel and into a smaller inside line, the two inside lines thereby created being joined in a channel junction leading to the central injection channel.

Another advantageous feature suggested by the invention provides that in each bifurcation section and junction section all channel portion contours are smoothly curved and that the inner contour lines of the branch channel portions are similarly curved toward their junction point, thereby forming channels of even cross section which are free of recesses and corners, or other flow obstacles. The result is a very smooth constant-speed material flow at all points in the channel system of the improved injector nozzle.

BRIEF DESCRIPTION OF THE DRAWINGS

Further special features and advantages of the invention will become apparent from the description following below, when taken together with the accompanying drawings which illustrate, by way of example, an embodiment of the invention represented in the various FIGS. as follows.

DESCRIPTION OF THE PREFERRED EMBODIMENT

Figure 1:
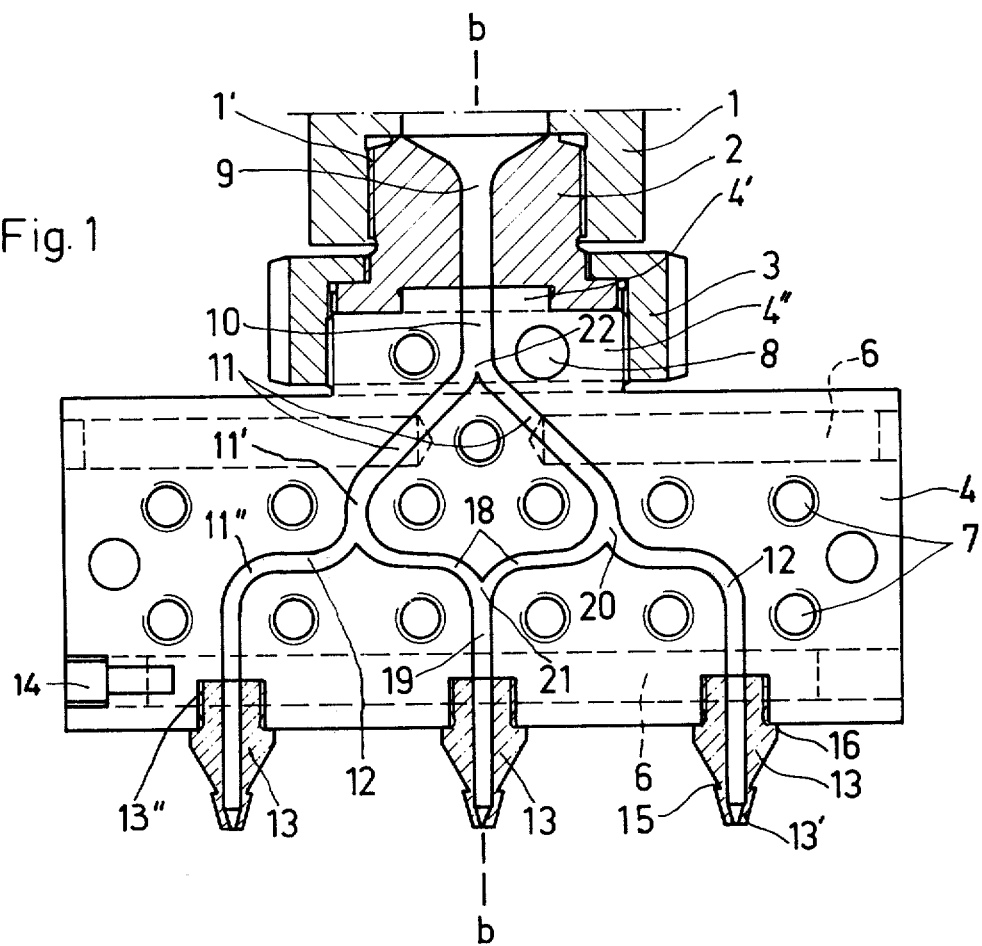
FIG. 1 shows in a longitudinal cross section a multiorifice injector nozzle embodying the invention.
Figure 2:
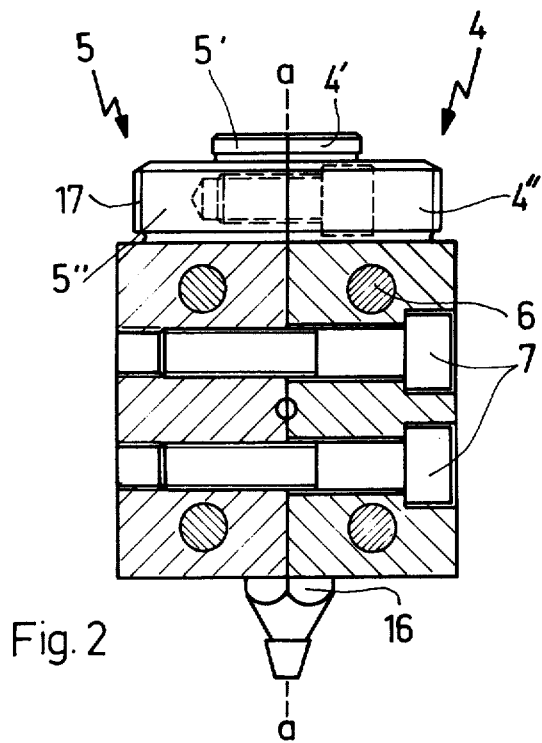
FIG. 2 is a transverse cross section of the injector nozzle of FIG. 1.
Figure 3:
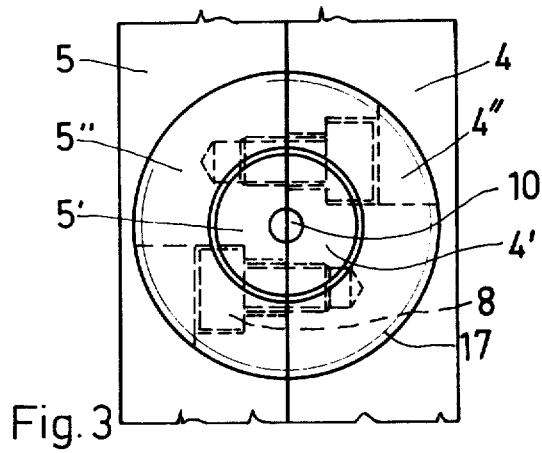
FIG. 3 shows a portion of the injector nozzle of FIG. 1 in a plan view.

In FIGS. 1–3 is illustrated an injector nozzle, comprising a block-shaped nozzle head composed of two head halves 4 and 5 (FIG. 2) abutting against each other along their separation plane $a-a$ with flat, finely polished faces. The two head halves 4 and 5 are clamped together by means of clamping screws 7. On their upper side the two head halves are machined to define a cylindrical extension 4'', 5'' with a male thread 17 on its periphery. The latter is engagable by the clamping nut 3 of the connector 2, which in turn is attached to the discharge end of the plastification cylinder 1 of an injection unit (not shown). The connector 2 further includes a centering recess engaged by a matching centering shoulder 4', 5' of the extension 4'', 5'', the clamping nut 3 being axially confined between a collar of the connector piece 2 and the end face of cylinder 1, into which the connector 2 is screwed by means of a threaded portion 1'.

At the lower side of the nozzle head 4, 5 are arranged several non-closable nozzle inserts 13, the illustrated embodiment featuring three such nozzle inserts arranged in parallel alignment. These nozzle inserts 13 are screwed into the nozzle head at equal distances from each other and in alignment with the head separation plane $a-a$. They are made of a beryllium-copper alloy of high head conductivity. Each nozzle insert 13 comprises at tapered seating portion 13' of a length approximately twice the diameter of its injection channel, a neck 15 delimiting said seating portion 13', a suitable threaded shank 13'', and a hexagonal portion 16 for engagement by a wrench.

Each head half is also provided with two heater cartridges 6 extending parallel to the head separation plane $a-a$. These heater cartridges 6 are arranged in the upper and lower portions of the nozzle head 4, 5, in order to permit accomodation therebetween of a number of clamping screws 7 (FIG. 1). Two additional clamping screws 8 are arranged in the cylindrical extension 4'', 5'', and still another clamping screw is arranged in the center axis of the injector head, between the upper heater cartridges 6. The lower heater cartridges 6 are retained in position by means of retaining screws 14.

In the illustrated embodiment, the central channel 9 of the connector piece 2 leads straight into the main channel 10 in the split nozzle head 4, 5, in alignment with its separation plane. This main channel 10 leads to a bifurcation or Y-section 22, creating two intermediate channels 11 which slant downwardly and away from each other at an angle of approximately 45° to the injector axis b—b. The flow cross section of the intermediate channels 11 is half as large as that of the main channel 10. Each slanting intermediate channel 11 leads to a second bifurcation or Y-branch 20, by which the channel is again split into an outer branch 12 and an inner branch 18. While the outer branches 12 run approximately horizontally in opposite direction, curving downwardly into vertical injection channels, the inner branches 18 run likewise horizontally, but toward each other and into a junction 21 from which a central injection channel 19 leads downwardly into a central nozzle insert 13.

Since the flow cross section of each of the three injection channels (reference numerals 12 and 19) is to be identical and one-third of the flow cross section of main channel 10, the flow of both slanting intermediate channels 11 has to be divided unevenly at the bifurcation 20, the cross section of the inner branch 18 being one-half of the cross section of the outer branch 12. The latter, of course, is one-third of the cross section of main channel 10.

As can be seen from FIG. 1, all channels and channel branches are smoothly curved, wherever they change direction and/or where they separate from, or join other channels. Thus, the curvature 11' of the slanting channels 11 leading to the bifurcations 20 continues in a smooth radius to lead into the upper outline of the horizontal channel branches 12 and 18, the outer branch channels 12 having similar curvatures 11'' leading to the corresponding injection channels. The radii of these curvatures are between 9 and 15 mm, perferably 12 mm. Similar curvatures are also provided at those channel portion outlines which meet in a junction point at the inside of the bifurcations 22 and 20 and of the channel junction 21.

The result of these channel dimensions and carefully coordinated channel curvatures is a material flow of even speed throughout all the channels, free of turbulence due to dead corners common of normal right-angle bifurcations and junctions, so that the plastic material is maintained at an even temperature, while it flows from the plastification cylinder 1 to the three nozzle inserts 13. Another factor contributing to these desirable conditions is the arrangement of the two bifurcations 20 and of the junction 21 at approximately mid-distance between the upper and lower heater cartridges 6.

The overall result of these suggestions is the elimination of previously encountered thermal decomposition of certain very temperature-sensitive injection materials, as mentioned in the introductory portion of this disclosure. Multi-orifice injector nozzles, as suggested by the present invention, are therefore particularly suitable for use in connection with the injection blow-molding of bottles and the like, where thermoplastic material is simultaneously injected into multiple molds, and the injected bottle parisons are then blow-formed to their final shape. An example of such a blow-molding device is disclosed in my earlier-mentioned copending application Ser. No. 259,279.

The particular channel contours, as shown in FIG. 1 and described further above, are obtained by milling precise, congruent grooves into the clamping faces of the two head halfs 4 and 5, all grooves being preferably semi-circular in cross section. The mating faces of the head halves 4 and 5 are perfectly flat and finely polished. Following milling of the various channels in the two head halves, the latter are joined and clamped together by means of the clamping screws 7 and 8, whereupon the cylindrical extension 4'', 5'' and threaded seats 13'' for the nozzle inserts 13 are machined. The resulting channel system is free of any sharp corners, recesses, or shoulders. All channel cross sections are continuous and even, and the sum of all branch cross sections at any given level in the nozzle head is identical to the flow cross section of the main channel 10.

It should be understood, of course, that the foregoing disclosure describes only a preferred embodiment of the invention and that it is intended to cover all changes and modifications of this example of the invention which fall in the scope of the appended claims.

I claim:

1. In an injection molding machine having an injection mold with a plurality of injection ports for the simultaneous injection of plastic material therethrough, and an injection unit with a plastification cylinder for supplying plastified material to the injection mold, a multi-orifice injector nozzle attachment for the injection unit adapted, for example, for the processing of clear, temperature-sensitive plastic materials, the attachment comprising in combination:

a nozzle head in the form of a split block constituted by two block halves joined together along flat clamping faces defining a central separation plane;

a system of flow channels extending through the nozzle head in alignment with its separation plane, so that the channel walls are constituted jointly by the contiguous block halves, the channel system including:

a main channel entering the nozzle head from one side thereof;

three parallel smaller injection channels leaving the nozzle head on the side opposite the main channel;

a primary channel bifurcation having an entry portion communicating with the main channel and two exit portions opening into two intermediate channels;

two transversely spaced secondary channel bifurcations, each having an entry portion communicating with one of said intermediate channels and two exit portions of which the outer one leads to the respective outer injection channel and the inner one coverges with the inner exit portion of the other secondary bifurcation; and a central channel junction having two entry portions communicating with said converging inner exit portions and an exit portion opening into the central injection channel; and wherein the entry and exit portions of the several channel bifurcations and of the channel junction have curved, smoothly continuing wall outlines and gradual diameter transitions, free of recesses, for an even flow of plastic material therethrough; the nozzle attachment further comprising:

means for removably connecting the nozzle head to the discharge end of the plastification cylinder, so that its main channel sealingly communicates with said cylinder; and means for clamping together the two block halves of the nozzle head so as to establish hermetic contact between their clamping surfaces along the outline of said channel system.

2. A nozzle attachment as defined in claim 1, wherein:
for each channel bifurcation, the cross-sectional area of the entering channel is substantially equal to the sum of the cross-sectional areas of the two exiting branch channels; and
the cross-sectional areas of all injection channels are equal in size, the sum thereof being substantially equal to the cross-sectional area of the main channel.

3. A nozzle attachment as defined in claim 1, wherein:
the two intermediate channels are slanted away from the centerline of the main channel;
the outer and inner exit portions of the secondary channel bifurcations extend in mutually opposite alignment; and
the wall contour curvatures of all entry and exit portions of said bifurcations and junction in the nozzle head separation plane are defined by a succession of concentric arcs.

4. A nozzle attachment as defined in claim 1, wherein:
the entry portions of the secondary channel bifurcations are parallel to the main channel, joining the slanted intermediate channels with a bend portion;
the outer exit portions of the secondary channel bifurcations join the outer injection channels with a similar bend portion; and
both sets of bend portions have substantially the same arcuate curvature as said bifurcation entry and exit portions.

5. A nozzle attachment as defined in claim 4, wherein:
the median radius of the curvatures of the channel bifurcation portions, channel junction portions, and other channel wall portions between the main channel and the injection channels is between 9 and 15 mm, and preferably 12 mm.

6. A nozzle attachment as defined in claim 1, wherein:
for each channel bifurcation, the cross-sectional area of the entering channel is substantially equal to the sum of the cross-sectional areas of the two exiting branch channels;
the cross-sectional areas of the three injection channels are equal in size, the sum thereof being substantially equal to the cross-sectional area of the main channel; and
the cross-sectional areas of said inner converging exit portions is substantially one-half the size of the cross-sectional area of the central injection channel.

7. A nozzle attachment as defined in claim 1, wherein:
the secondary channel bifurcations are located approximately at mid-distance between the central injection channel and the outer injection channels.

8. A nozzle attachment as defined in claim 1, wherein:
the nozzle head further includes: at least one upper and lower heater cartridge in each block half and a plurality of transverse clamping screws serving as the clamping means and located in the central block portion between said upper and lower heater cartridges; and
the exit portions of the secondary channel bifurcations are located approximately half-way between the upper and lower heater cartridges between pairs of clamping screws.

9. A nozzle attachment as defined in claim 1, further comprising;
three nozzle inserts of highly heat-conductive beryllium-copper alloy attached to the nozzle head at the exit side of the injection channels, each nozzle insert having a central bore continuing the injection channel beyond the outline of the nozzle head; and wherein
each nozzle insert includes: a tapered outer seating portion which is approximately twice as long as the diameter of the injection channel, a recessed neck delimiting the axial length of said seating portion, and a threaded opposite end portion engaging the nozzle head.

10. A nozzle attachment as defined in claim 1, wherein:
the connecting means between the nozzle head and the plastification cylinder includes:
a connector piece which is removably threaded into the discharge end portion of said cylinder;
a rotatable clamping nut axially confined between the connector piece and the cylinder; and
a male-threaded cylindrical extension on the nozzle head body concentrically surrounding its main channel, said extension being engageable by the clamping nut.

11. A nozzle attachment as defined in claim 10, wherein;
the connector piece and the nozzle head body define between them means for centering the cylindrical extension of the latter with respect to the connector piece and plastification cylinder.

* * * * *